(12) United States Patent
Chen (10) Patent No.: US 12,317,166 B2
(45) Date of Patent: May 27, 2025

(54) DATA-AWARE ROUTING METHOD AND SYSTEM FOR AD HOC WIRELESS VEHICULAR NETWORK, STORAGE MEDIUM AND DEVICE

(71) Applicant: Shenzhen Polytechnic, Shenzhen (CN)

(72) Inventor: Qiuxia Chen, Shenzhen (CN)

(73) Assignee: Shenzhen Polytechnic, Shenzhen (CN)

( * ) Notice: Subject to any disclaimer, the term of this patent is extended or adjusted under 35 U.S.C. 154(b) by 449 days.

(21) Appl. No.: 18/051,885

(22) Filed: Nov. 2, 2022

(65) Prior Publication Data

US 2023/0292216 A1    Sep. 14, 2023

(30) Foreign Application Priority Data

Nov. 9, 2021   (CN) .......................... 202111319413.2

(51) Int. Cl.
*H04W 40/20* (2009.01)
*H04W 40/12* (2009.01)
(52) U.S. Cl.
CPC ........... *H04W 40/20* (2013.01); *H04W 40/12* (2013.01)
(58) Field of Classification Search
CPC combination set(s) only.
See application file for complete search history.

(56) References Cited

U.S. PATENT DOCUMENTS

2011/0006913 A1 *   1/2011   Chen ...................... G08G 1/161
                                                          340/902

OTHER PUBLICATIONS

Zhi Li, Practical Location-based Routing in Vehicular Ad Hoc Networks, 2009, IEEE 978-1-4244-5113-5/09, pp. 900-905. (Year: 2009).*
Liang Zhao, A Novel Prediction-Based Temporal Graph Routing Algorithm for Software-Defined Vehicular Networks, 2021, IEEE 1558-0016, pp. 13275-13290 (Year: 2021).*

* cited by examiner

*Primary Examiner* — Kouroush Mohebbi
(74) *Attorney, Agent, or Firm* — Bayramoglu Law Offices LLC (57) ABSTRACT

According to a source node and a destination node of each data packet p in a given data packet set required to be transmitted by the wireless vehicular network, the joint scheduling based wireless vehicular network routing algorithm determines overall transmission performance of the wireless vehicular network and a transmission latency and transmission cost of the data packets, and determines an optimal transmission strategy. A multi-order Markov chain is used to model position change processes of vehicle nodes, and a next moment and several moments in the future are predicted and estimated under the condition that positions at previous several moments are given. On the basis of position actual values and predicted estimated values of the vehicle nodes, the optimal transmission strategy is combined to achieve data routing in the wireless vehicular network. The data-aware routing method is mainly used for data communication of a vehicular ad hoc network.

20 Claims, 3 Drawing Sheets

DATA-AWARE ROUTING METHOD AND SYSTEM FOR AD HOC WIRELESS VEHICULAR NETWORK, STORAGE MEDIUM AND DEVICE

CROSS REFERENCE TO THE RELATED APPLICATIONS

This application is based upon and claims priority to Chinese Patent Application No. 202111319413.2, filed on Nov. 9, 2021, the entire contents of which are incorporated herein by reference.

TECHNICAL FIELD

The present disclosure relates to a routing method for a vehicular ad hoc network, and belongs to the technical field of wireless vehicular network communication.

BACKGROUND

With continuous development of the wireless mobile communication technology and the short-range wireless communication technology and popularization of the wireless communication devices and terminals, wireless vehicular networks came into being. Wireless communication can be formed between vehicles within a certain distance by means of medium and short range wireless communication devices mounted on the vehicle, such as dedicated short range communications (DSRC) and wireless local area network IEEE 802.11 (WiFi); and after a wireless base station is mounted on a roadside, the vehicle and roadside facilities can also achieve wireless information interaction, and a vehicle node and a roadside facility system together constitute a novel wireless mobile ad hoc network, i.e., the wireless vehicular network. The vehicle node can carry a wide range of sensing devices, such as global positioning system (GPS) position and speed sensing devices, road vibration sensing devices and environment sensing devices, and the wireless vehicular network is also a crowd sensing network having strong sensing ability and wide coverage.

Development of the wireless vehicular network will breed and support a number of important applications in social and economic life, including traffic warning and safety, mobile monitoring, intelligent transportation, network access, office entertainment, etc.

Traffic safety application: by means of real-time wireless information interaction between the vehicles, traffic safety can be effectively improved. For example, after a traffic accident occurs in front of the expressway, the front vehicles can inform relevant vehicles nearby of the accident position and time by means of wireless communication such that the front vehicles can pay attention to reducing the driving speed and avoiding accident vehicles. By means of information exchange, the front and rear vehicles can sense each other's real-time position and pay attention to maintaining a safe driving distance.

Mobile city monitoring: by mounting sensing devices on the vehicle, such as air quality, temperature and humidity, and three-dimensional accelerometer, environmental information and road maintenance status of the city can be sensed in real time, which can improve the maintenance level of the road and improve the environmental quality of urban life.

Intelligent transportation application: GPS receiving terminals have become increasingly popular. By mounting the GPS position and speed sensing devices on the vehicle, the vehicle can obtain the current physical position and driving speed in real time. By making a large number of statistics on the driving speed of the vehicles, the urban operation management department can timely grasp the current traffic conditions of each road, and rapidly take counter measures after traffic congestion. Meanwhile, by means of long-term statistical analysis, important data reference can be provided for scientific planning of municipal construction.

Network access application: by means of multi hop wireless transmission between vehicle nodes and wireless communication between the vehicle nodes and roadside wireless base stations, Internet access and various Internet applications can also be achieved during high-speed vehicle operation.

The wireless vehicular network is similar to a traditional mobile ad hoc network (MANET) in many aspects, such as node mobility, medium and short range wireless communication and multi hop data transmission. However, it should be recognized that the wireless vehicular network presents a wide range of new node and network characteristics, making the wireless vehicular network significantly different from the traditional MANET, which means that a wide range of existing methods designed for the MANET are not suitable for the wireless vehicular network.

1) Poor network connectivity: in a MANET system, network connectivity is excellent, and any node is connected to other network nodes. In the wireless vehicular network, the connectivity of nodes largely depends on distribution density of the vehicles. In areas where vehicles are concentrated, the node can communicate with a wide range of neighbor nodes and have excellent connectivity; and in areas where vehicles are not concentrated, there are few neighbor nodes for vehicle communication, even only the vehicle itself. In a word, in the vehicular ad hoc network, it cannot be assumed that the whole network is connected.

2) rapid change of a network topology: vehicle nodes have mobility much greater than that of MANET nodes and a movement speed capable of reaching 30 m/s or above, resulting in rapid changes in the topology of the wireless vehicular network and poor stability of network topology characteristics.

3) Randomness and limitation of node motion: vehicle nodes in the wireless vehicular network are limited by the topology of the road network, and vehicles can only travel on the road. Meanwhile, the motion of the vehicle node is often carried out according to its own wishes, and the motion of the node has great randomness.

4) Regularity of node motion: on the basis of the limitation of node motion, vehicle motion is not completely random and irregular. Vehicle nodes usually travel in a straight line along the road, and only change the direction of travel at the traffic intersection, and the motion area of vehicle nodes also presents certain regularity.

5) Mixing of dynamic and static nodes: in the wireless vehicular networks, there are not only mobile vehicle nodes, but also static nodes mounted on the roadside. Vehicle nodes can not only communicate with other moving vehicle nodes, but also exchange information with static nodes. In the MANET, nodes are generally mobile.

6) Abundant node resources: MANET node resources, such as electric energy and storage space, are limited. However, on vehicle nodes, node resources, especially electric power resources, are abundant. There is no need to consider how to save electric energy as the design of a MANET system.

7) Uneven distribution of nodes: in the wireless vehicular networks, the distribution of nodes depends on the distribution of vehicles in the actual road network. Generally, the uneven distribution of vehicles has strong correlation with geographic position and road type. In urban hot spot regions, the vehicles have high density; and on roads having excellent traffic capacity, such as urban high rise express way, the distribution of vehicles is sparse.

8) Large network scale: in the wireless vehicular network, the node scale can reach thousands or even tens of thousands, while in the MANET, the typical number of nodes is dozens or hundreds. The node scale of the wireless vehicular network is much greater than that of the traditional MANET.

SUMMARY

In order to solve the problem that an existing routing method may not be suitable for a vehicular network, the present disclosure further provides a data-aware routing method for ad hoc wireless vehicular networks.

A data-aware routing method for an ad hoc wireless vehicular network is provided. The data-aware routing method includes: for the wireless vehicular network, carrying out data routing in the wireless vehicular network on the basis of a joint scheduling based wireless vehicular network routing algorithm;
the joint scheduling based wireless vehicular network routing algorithm including:
the wireless vehicular network needing to transmit a given data packet set, which is recorded as Φ, a source node of each data packet p being recorded as δ(p), and a destination node of each data packet p being recorded as ψ(p); p having no subscript being used for representing the data packet, and $p_i(\ )$ having a node subscript being used for representing a geographic position;
for a certain data packet p, a copy set of all the data packets in the network being recorded as θ(p), which is called as a data packet group; when the data packets are subjected to one-time wireless transmission, a size of the data packet group being increased by 1;
overall transmission performance of the wireless vehicular network being a function of transmission performance of the single data packet, a transmission success rate $\rho_p$ of the single data packet being as follows:

$$\rho_p = f_\gamma(\delta(p), \psi(p), \{T_n\}) \quad (4),$$

$\{T_n\}$ representing a motion track set of all the nodes, and $f_\gamma(\cdot)$ representing a transmission success rate function;
a transmission latency $\sigma_p$ of the data packet p being as follows:

$$\sigma_p(\tau) = \tau + \Gamma_\gamma(\delta(p), \psi(p), \{T_n\}) \quad (5),$$

$\Gamma_\gamma(\ )$ representing a transmission latency function;
transmission cost $\varsigma_p$ of the data packet p being as follows:

$$\varsigma_p = |\theta(p)| \quad (6),$$

$|\theta(p)|$ representing capacity of the data packet group θ(p);
an optimal transmission strategy being as follows: maximizing the transmission success rate, minimizing the transmission latency and minimizing network cost:

$$\max \Sigma_{p \in \Phi} \mathbb{E}[\rho_p] \quad (7),$$

$$\min \Sigma_{p \in \Phi} \mathbb{E}[\sigma_p] \quad (8), \text{ and}$$

$$\min \Sigma_{p \in \Phi} \mathbb{E}[\varsigma_p] \quad (9).$$

$\mathbb{E}[\cdot]$ representing an expectation;
and network transmission efficiency being as follows:

$$\ell \Sigma_{p \in \Phi} \mathbb{E}[\rho_p]/\Sigma_{p \in \Phi} \mathbb{E}[\varsigma_p] \quad (10),$$

using a multi-order Markov chain to model position change processes of the vehicle nodes, and predicting and estimating a next moment and several moments in the future under the condition that positions at previous several moments are given; and
on the basis of position actual values and predicted estimated values of the vehicle nodes, combining the optimal transmission strategy to achieve data routing in the wireless vehicular network.

Further, a wireless vehicular network model and a crowd sensing model corresponding to the wireless vehicular network are as follows:
the wireless vehicular network model is constructed on the basis of an undirected graph; the geographic position of the vehicle node n at a moment τ is represented as pn (τ), and a motion track of the node from a moment zero to the moment τ is discretized:

$$T_n = <p_n(0), p_n(1), \ldots p_n(\tau)>,$$

τ representing time after discretization;
a distance between two nodes i and j at the moment τ is represented as dij(τ); all links capable of data transmission in the current wireless vehicular network are represented as, $$L(\tau) = \{l_{i,j} | d_{i,j}(\tau) \leq R; \forall i, j \in N\}$$

$l_{i,j}$ representing a link between the nodes i and j, and R representing a link distance threshold;
and the crowd sensing model is constructed: a sensing data function obtained by a vehicle i is as follows:

$$\Delta(t, p_i(t), i),$$

$p_i(t)$ representing a corresponding geographic position of the vehicle i at a moment t.
Further, the wireless vehicular network model and the crowd sensing model corresponding to the wireless vehicular network are as follows:
the undirected graph of the wireless vehicular network model is G=(N, E), N being a set of vertices, each vertex representing a vehicle node, E being a set of edges, $\forall e \in E$, $e_n = ((i,j), c(t), d(t))$ being an edge between vertices i and j, and representing communication between the two nodes, c(t) representing contact of the nodes i and j at a moment c(t), and d(t) representing a contact duration.

Preferably, the link distance threshold R is 400 meters.
Further, a process of using a multi-order Markov chain to model position change processes of the vehicle nodes includes:
dividing an entire position space corresponding to the vehicle nodes into Q grids, the position space being represented as S:

$$S = \{s_0, s_1, \ldots, s_{Q-1} | s_{i''} \cap s_{j''} = \emptyset\} \quad (12),$$

$s_0, s_1, \ldots, s_{Q-1}$, representing position spaces corresponding to the grids in the entire position space, and $s_{i''}$ and $s_{j''}$ representing position spaces corresponding to the grids in the entire position space respectively;
at a certain moment, taking a certain value in S as a position of the vehicle i, which is recorded as $S_i$; determining space-time correlation of vehicle motion by means of entropy and conditional entropy of a position random variable $S_i$:
for the vehicle i, assuming that the position of the vehicle i at L times is observed, a position sequence of the vehicle being represented as: $T_i = <s_0, s_1, \ldots, s_{L-1}>$; and assuming that the vehicle i appears for $o_{j''}$ times at the position $s_{j''}$ in the sequence, marginal entropy of Si being as follows:

$$H(S_i) = \sum_{j''=0}^{Q-1} (o_{j''}/L) \times \log_2 \frac{1}{o_{j''}/L}, \quad (13)$$

the conditional entropy of $S_i$ under the condition that the position variable $S_i^1$, at the previous moment is given being as follows:

$$H(S_i|S_i^1) = H(S_i, S_i^1) - H(S_i) \quad (14), \text{ and}$$

entropy of a joint position random variable being as follows:

$$H(S_i, S_i^1) = \sum_{j''=1}^{Q-1} \frac{o_{j''-1,j''}}{L-1} \times \log_2 \frac{1}{o_{j''-1,j''}/(L-1)}, \quad (15)$$

$o_{j''-1,j''}$ representing the number of occurrences of the vehicle in positions $s_{j''-1}$ and $s_{j''}$ in the sequence;

on the basis of the same method, obtaining conditional entropy of given position variables at previous K moments:

$$H(S_i|S_i^1, S_i^2, \ldots S_i^K) \quad (16); \text{ and}$$

predicting and estimating positions of the vehicle nodes on the basis of the multi-order Markov chain.

Preferably, the entire position space corresponding to the vehicle nodes is divided into Q grids having a grid size of 200 m*200 m.

A data-aware routing system for an ad hoc wireless vehicular network is provided. The system is used for executing the data-aware routing method for an ad hoc wireless vehicular network is provided.

A storage medium is provided. The storage medium stores at least one instruction, where the at least one instruction is loaded and executed by a processor, to implement the data-aware routing method for an ad hoc wireless vehicular network.

A device is provided. The device includes a processor and a memory, where the memory stores at least one instruction, and the at least one instruction is loaded and executed by the processor, to implement the data-aware routing method for an ad hoc wireless vehicular network.

Beneficial Effects

The present disclosure not only may well solve the problem of poor vehicular network connectivity, but also may adapt to the characteristic of rapid change of a network topology of the wireless vehicular network, and may well solve a routing problem of the data packets in the vehicular network, to achieve communication in the vehicular network.

DETAILED DESCRIPTION OF THE EMBODIMENTS

Embodiment I

This embodiment is a data-aware routing method for an ad hoc wireless vehicular network. The data-aware routing method includes:

S1, collect large-scale real vehicle operation data and construct a network and sensing model:

the data used in this embodiment is real operation data of more than 10,000 taxis and more than 3,000 buses in Shenzhen, i.e., vehicle fine-grained position tracking data and vehicle real-time orientation and speed sensing data, from January, 2015 to December, 2016.

A global positioning system (GPS) position and speed sensing device is mounted on a vehicle node, to obtain position information, operation direction and instantaneous motion speed of the node in real time, and a passenger carrying condition (i.e., no-load or heavy-load) of the vehicle node may further be obtained by a taxi vehicle node. A data structure of the sensing data of the vehicle node is described as follows:

| Vehicle ID | Longitude | Latitude | Speed | Angle | Timestamp | Status |
| --- | --- | --- | --- | --- | --- | --- |

Vehicle ID is a unique identification of the vehicle, Longitude and Latitude are instantaneous latitude and longitude information of the node respectively, Speed is the instantaneous speed of the vehicle, Angle is the instantaneous operation direction of the vehicle node, Timestamp is a moment of sensing data recording, and Status represents state information of the vehicle, and for a taxi, represents a passenger carrying condition of the vehicle. An operation range of the vehicle node covers a whole Shenzhen urban area, and a coverage area reaches 400 or more of square kilometers. The vehicle node generate sensing data once every 10 seconds to several minutes and transmit the sensing data back to a data center by means of a GPRS wireless data channel, and specific interval time is different due to different vehicles and has large non-uniformity. In addition, sensing data may be lost during transmission due to unreliability of a wireless data channel. The real operation data contributed by these vehicles is large in scale, and the scale of compressed data reaches 112 GB.

In an urban environment, due to the influence of tall buildings such as tall buildings and viaducts, GRS positioning data may have large errors, and the errors vary from several meters to several hundred meters. According to road information of an electronic map of Shenzhen and continuity of vehicle node motion, a dislocation position is corrected (Map-Matching).

By analyzing the operation data of the vehicle in Shenzhen on a large scale, a wide range of uniqueness of the wireless vehicular network, including poor network connectivity, non-uniform node distribution and non-uniform taxi distribution, may be found and verified; a topology of the network is closely related to a wireless communication distance (R) of the node and the total number of the nodes of the network, under the condition that the number of the vehicle nodes is 1000 and a communication distance is 200 meters, the topology of the network is discrete, and for any pair of nodes, there is basically no connected path; and when the communication distance is increased to 400 meters, the connectivity of the network is greatly improved, and a plurality of clusters having excellent connectivity may be seen.

When the communication distance is kept unchanged and the total number of nodes of the network is increased, the connectivity of the network may also be improved, and the plurality of clusters having excellent connectivity may also be obviously seen. However, even under excellent conditions having the number of the network nodes of 2000 and the communication distance of 400 meters, there are a wide range of non-connected sub-networks within the vehicular network, that is, network non-connectivity is a normal state in the wireless vehicular network.

Figure 1:
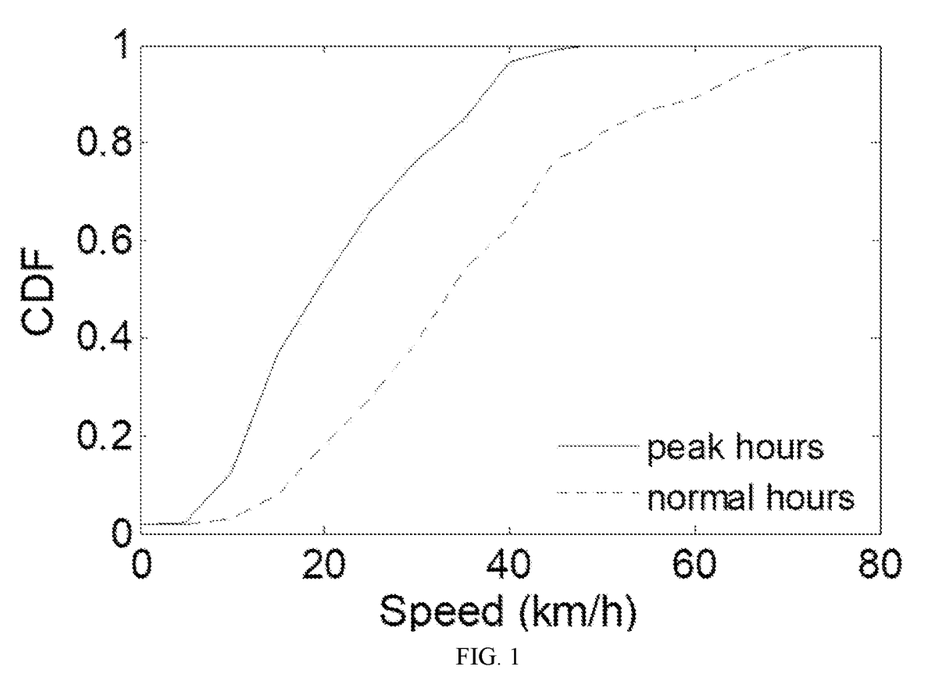
FIG. 1 is a distribution graph of a cumulative distribution function (CDF) graph of a vehicle speed.
Figure 2:
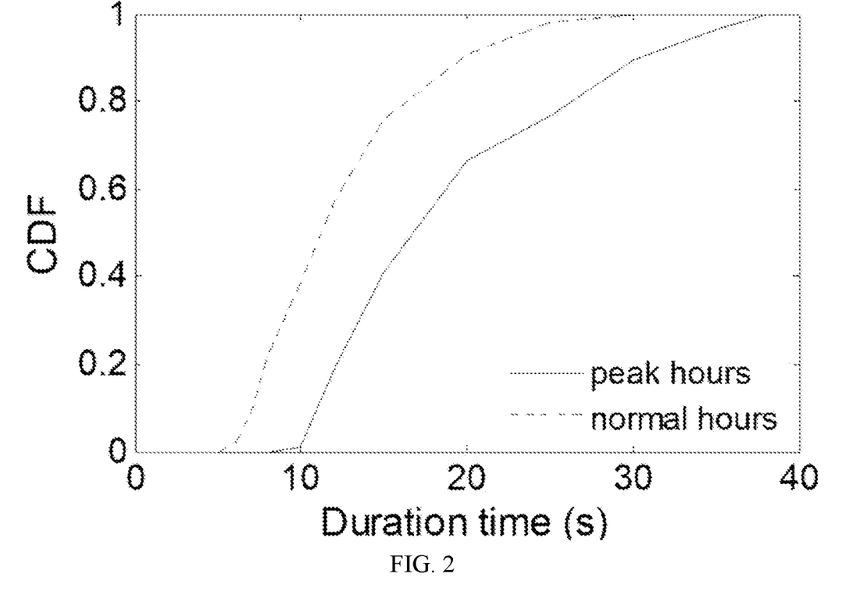
FIG. 2 is a distribution graph of vehicle meeting time.

In the wireless vehicular network, current vehicle ability to communicate with other vehicles is related to a plurality of factors, including vehicle speed, vehicle distribution density, vehicle meeting time distribution, etc. and the vehicle distribution density and the vehicle meeting time distribution are shown in FIGS. 1 and 2. By means of analysis of data of taxies in Shenzhen, two time periods of Oct. 13, 2007 are selected, and are 8:00-9:00 in the morning of a peak period and 3:00-4:00 in the afternoon of a non-peak period respectively, the operation speed of 95% of vehicles in the peak period is 40 km/h or below, and the speed of 65% of vehicles in the non-peak period is 40 km/h or below. Under the condition that the communication distance is 100 meters, meeting time between 60% of vehicles is less than 10 s in the non-peak period, and meeting time between 65% of vehicles is less than 20 s in the peak period.

Firstly, a wireless vehicular network model and a crowd sensing model are established, and have an vital effect of designing and developing the wireless vehicular network and an upper-layer crowd sensing application.

The network connectivity performance of the wireless vehicular network is between a mobile ad hoc network (MANET) and a delay tolerant network (DTN). It is generally considered that the connectivity of the MANET is excellent, and a connected path exists between two nodes at any moment. In the DTN network, the network connectivity is poor, most of time nodes are isolated and not connected, and the nodes occasionally contact to form a wireless communication opportunity.

Figure 3:
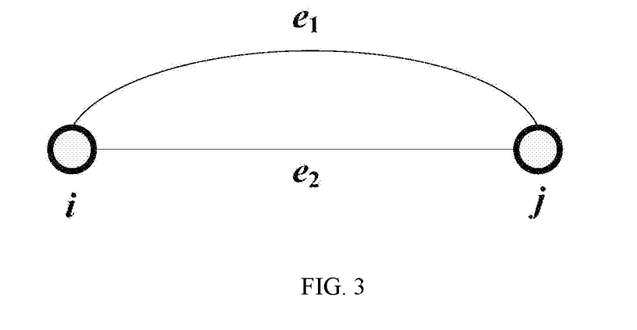
FIG. 3 is a schematic diagram of an abstract model of a wireless vehicular network.

On the basis of such recognition, the present disclosure provides the following abstract model of the wireless vehicular network: a network abstract model of the wireless vehicular network in a time interval (0, T) may be defined as an undirected graph G=(N, E), where N is a set of vertices, each vertex representing a vehicle node, E is a set of edges, $\forall e \in E$, $e_n = ((i,j), c(t) \text{ and } d(t))$ is an edge between vertices i and j, and represent communication between the two nodes. As shown in FIG. 3, c(t) represents contact of i and j at a moment c(t), and a contact duration is d(t). d(t) determines communication capacity of the nodes i and j in the current contact, and the larger the value is, the larger transmission capacity of the two nodes in the current contact is.

A single vehicle node n travels in an urban road network at time (0, T). In a simplified case, a geographic position $p_n(t)$ of the single vehicle node is a continuous curve on a two-dimensional plane, and possible values of $p_n(t)$ are a road and possible parking places on a two-dimensional plane, which reflects that motion of the vehicle node is limited by the road network and the node motion has no randomicity.

When discretized time is used, the vehicle node n is represented as $p_n(\tau)$ at time $\tau$. A motion track of this node from the moment zero to the moment $\tau$ may be represented as:

$$T_n = <p_n(0), p_n(1), \ldots p_n(\tau)> \quad (1),$$

where $\tau$ represents time after the discretized time; and a distance between two nodes i and j at the moment $\tau$ is represented as $d_{i,j}(\tau)$. All transmissible links in the current wireless vehicular network are represented as $L(\tau)$:

$$L(\tau) = \{l_{i,j} | d_{i,j}(\tau) \leq R; \forall i,j \in N\} \quad (2),$$

where $l_{i,j}$ represents a link between the nodes i and j, and R represents a distance threshold of the transmissible link; and establishment of the crowd sensing model is a basis of high-level crowd sensing application optimization design. The present disclosure provides the following crowd sensing model. The sensing data obtained by the vehicle i is a function, which is as shown as follows:

$$\Delta(t, pi(t), i) \quad (3),$$

where $p_i(t)$ represents the corresponding geographic position of the vehicle i at the moment t; and the collected sensing data is related to time at which the data is generated, the position of the node, and the vehicle.

S2, construct a joint scheduling based wireless vehicular network routing algorithm:

an efficient routing algorithm in the wireless vehicular network has a basic effect, and determines data transmission performance between vehicle nodes, and routing performance indexes include a transmission success rate, a transmission latency, a network throughput, data transmission efficiency, etc. Various wireless vehicular network based high-level applications are established on the basis of the efficient routing algorithm, such that design of the efficient routing algorithm has a key effect in the wireless vehicular network.

However, design of the efficient routing algorithm for the wireless vehicular network faces numerous challenges. Firstly, the vehicular network of the traditional MANET has poor connectivity, and at a certain moment, there may not be a connected path between the source node and the destination node. Secondly, due to non-uniformity of node distribution in the vehicular network, different from the DTN, although the topology of the vehicular network is not connected, the local network has excellent connectivity, and even a plurality of wireless links which compete with one another exist. Finally, a moving speed of the vehicle node is high and may reach 30 m/s or above, node motion has great randomness, and a future motion track of the node has great uncertainty.

In order to study the optimal routing algorithm for the wireless vehicular network, a routing system model may be established as follows:

the wireless vehicular network needs to transmit a given data packet set which is recorded as $\Phi$, a source node of each data packet p is recorded as $\delta(p)$, and a destination node of each data packet p is recorded as $\psi(p)$. p and $p_i(\ )$ are parameters having different meanings, p having not subscript is used for representing a data packet, and $p_i(\ )$ having a node subscript is used for representing a geographic position; and when a data packet is forwarded over a certain wireless link, it may be considered that the data packet is copied from one node to another node (considering large storage capacity of the vehicle node). For a certain data packet p, a copy set of all the data packets in the network is recorded as θ(p) and is called as a data packet group. When the data packet is subjected to one-time wireless transmission, a size of the data packet group is increased by 1.

Overall transmission performance of the wireless vehicular network is a function of transmission performance of the single data packet, the transmission performance of the single data packet may be considered firstly, and the transmission performance of the network is further studied.

The transmission success rate $\rho_p$ of the single data packet is determined by a plurality of factors, including a routing policy and a motion track of all nodes:

$$\rho_p = f_\gamma(\delta(p), \psi(p), \{T_n\}) \quad (4),$$

where $\{T_n\}$ represents a motion track set of all the nodes; and $f_\gamma(\cdot)$ represents a transmission success rate function; and the success rate may be determined at the beginning when the motion track and the transmission strategy of the node are given. However, in reality, the future motion track of the node is agnostic, such that the transmission success rate may be considered as a random variable.

The transmission latency $\sigma_p$ of the data packet p is the sum of all the intra-network transmission times, the time may be divided into two parts, i.e., one part that has been already determined and the other part that needs to be used in the future and is not yet determined. Similar to analysis of the transmission success rate, $$\sigma_p(\tau) = \tau + \Gamma_\gamma(\delta(p), \psi(p), \{T_n\}) \quad (5) \text{ may be obtained,}$$

where $\Gamma_\gamma(\cdot)$ represents a transmission latency function; and transmission cost $\varsigma_p$ of the data packet p is the sum of transmission times generated during transmission of the data packet. Since the size of the data packet set θ(p) is increased by 1 each time, a final size of the data packet set θ(p) is also transmission cost of p:

$$\varsigma_p = |\vartheta(p)| \quad (6)$$

where |θ(p)| represents the capacity of the data packet group θ(p); and a design objective of an optimal transmission strategy is as follows: maximizing a transmission success rate, minimizing a transmission latency, and minimizing network cost:

$$\max \Sigma_{p \in \Phi} \mathbb{E}[\rho_p] \quad (7),$$

$$\min \Sigma_{p \in \Phi} \mathbb{E}[\sigma_p] \quad (8), \text{ and}$$

$$\min \Sigma_{p \in \Phi} \mathbb{E}[\varsigma_p] \quad (9),$$

where $\mathbb{E}[\cdot]$ represents an expectation.

The network transmission efficiency is as follows:

$$\ell \Sigma_{p \in \Phi} \mathbb{E}[\rho_p] / \Sigma_{p \in \Phi} \mathbb{E}[\varsigma_p] \quad (10).$$

With maximizing the transmission success rate as an example, the optimization objective may be written as:

$$\max \Sigma_{p \in \Phi} \mathbb{E}[f_\gamma(\delta(p), \psi(p), \{T_n\})] \quad (11).$$

If a transmission strategy needs to be determined, motion tracks of all the nodes need to be determined.

In the MANET, the core problem of data transmission is a link scheduling problem, that is, which wireless links in the network may perform wireless communication us determined, and since wireless conflicts exist between different links, an excellent routing algorithm needs to reduce conflicts to achieve maximum throughput data transmission in the network. In the DTN, nodes are not connected most of the time, and only when two nodes contact, the two nodes have the opportunity to achieve data communication. The core problem of data transmission of the DTN is the problem of data packet scheduling. That is, under the condition that node resources are limited, which data packets are exchanged when two nodes contact is decided.

Figure 4:
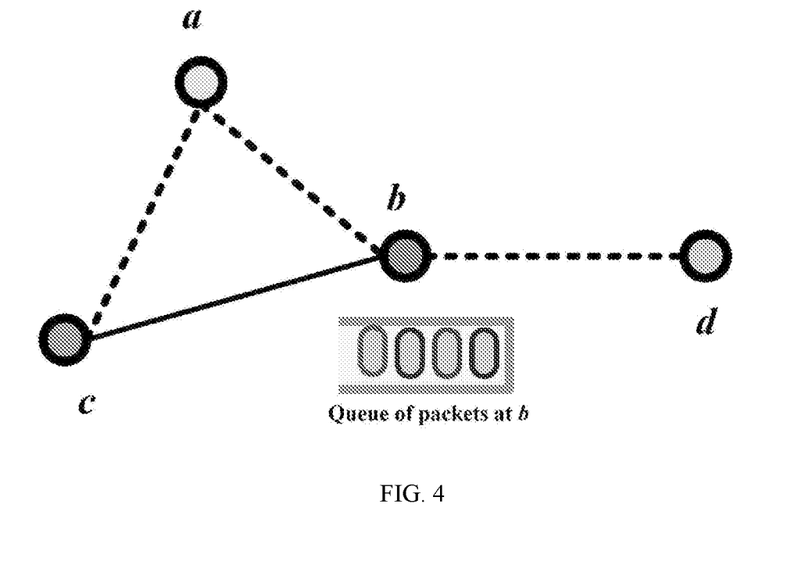
FIG. 4 is a schematic diagram of link scheduling and data packet scheduling.

The core problem of point-to-point data transmission and routing in the wireless vehicular network is link scheduling and data packet scheduling. The schematic diagram of link scheduling and data packet scheduling is shown in FIG. 4, dashed lines in FIG. 4 represent all possible wireless links, and a result of link scheduling is that bc links are activated and communicate wirelessly. In this case, the plurality of data packets to be transmitted exist on the node b, the task of data packet scheduling is to select data packets from the data packets to be transmitted, and transmit the data packets on the link bc, and since communication time between the node b and the node c is likely to be short, only the limited number of data packets may be transmitted.

The present disclosure provides an optimal routing algorithm for joint scheduling, which jointly considers link scheduling and data packet scheduling. In the optimal joint scheduling design, the motion tracks of the nodes are the key of optimal design. However, under actual conditions, the future tracks of the nodes are not predictable, which becomes a difficulty of joint scheduling design. However, through analysis of large-scale operation data of vehicles in Shenzhen, the present disclosure finds that the motion track of the vehicles in an urban environment has strong regularity. On the basis of the regularity, the future motion track of the vehicle node may be accurately predicted, such that important support is provided for joint scheduling and routing decision making.

The present disclosure analyzes track data of the taxi in Shenzhen to show that motion of the vehicle nodes has strong space-time correlation. For simplicity, the entire position space is divided into Q grids, such that the position space may be represented as S:

$$S = \{s_0, s_1, \ldots, s_{Q-1} | s_{i''} \cap s_{j''} = \emptyset\} \quad (12),$$

where $s_0, s_1, \ldots, s_{Q-1}$ represent position spaces corresponding to the grids in the entire position space, and $s_{i''}$ and $s_{j''}$ represent the position spaces corresponding to the grids in the entire position space respectively; and at a certain moment, a certain value in S is taken as the position of a vehicle i and is recorded as $S_i$; and the present disclosure recognizes the space-time correlation of the vehicle motion by analyzing entropy and conditional entropy of the position random variable $S_i$.

For the vehicle i, it is assumed that the position of the vehicle i at L moments is observed, and a position sequence of the vehicle is represented as: $T_i = \langle s_0, s_1, \ldots, s_{L-1} \rangle$. It is assumed that the vehicle i appears for $o_{j''}$ times at the position $s_{j''}$ in the sequence, such that marginal entropy of $S_i$ is computed as follows:

$$H(S_i) = \sum_{j''=0}^{Q-1} (o_{j''}/L) \times \log_2 \frac{1}{o_{j''}/L}. \quad (13)$$

The conditional entropy of $S_i$ under the condition that the position variable $S_i^1$, at the previous moment is given is as follows:

$$H(S_i|S_i^1)=H(S_i,S_i^1)-H(S_i) \quad (14), \text{ and}$$

where the entropy of a joint position random variable is as follows:

$$H(S_i, S_i^1) = \sum_{j''=1}^{Q-1} \frac{o_{j''-1,j''}}{L-1} \times \log_2 \frac{1}{o_{j''-1,j''}/(L-1)}, \quad (15)$$

where $o_{j''-1,j''}$ represents the number of occurrences of positions $s_{j''-1}$ and $s_{j''}$ of the vehicle in the sequence; and On the basis of the same method, the conditional entropy given the position variable at the previous K moments may further be computed:

$$H(S_i|S_i^1, S_i^2, \ldots S_i^K) \quad (16).$$

Cumulative distribution functions (CDF) of the marginal entropy and the conditional entropy of the vehicle position random variable are determined, and in this embodiment, the size of the grids is configured to be 200 m*200 m, and the number of nodes is controlled to be 500.

It may be determined that the conditional entropy is much less than the marginal entropy, which means that uncertainty of the position variable is small, which indicates that the uncertainty of the position variable at the current moment is greatly reduced under the condition that the position at the previous moment is given. It may further be observed that the conditional entropy is further reduced under the condition that the positions at the previous moments are given, which indicates that the uncertainty of the positions at the current moment may be reduced by giving previous several moments. However, it may also be seen that the degree of decreasing trend of the conditional entropy slows down rapidly, which indicates that given position information at previous moments may not be much helpful to determine the position at the current moment.

On the basis of the above analysis, multi-order Markov chains are used for modeling a position change process of the vehicle nodes, and a next moment and several moments in the future are predicted and estimated under the condition that the positions of the previous several moments are given.

On the basis of position actual values and predicted estimated values of the vehicle nodes, the optimal transmission strategy is combined to achieve data routing in the wireless vehicular network.

The routing method of the present disclosure is utilized, such that communication between a base station arranged on a roadside and the vehicle node and between the base stations may be achieved, a road condition may further be sensed, and a traffic condition may further be predicted.

Embodiment II

This implementation is a data-aware routing system for an ad hoc wireless vehicular network. The system is used for executing the data-aware routing method for an ad hoc wireless vehicular network.

Embodiment III

This implementation is a storage medium. The storage medium stores at least one instruction, where the at least one instruction is loaded and executed by a processor, to implement the data-aware routing method for an ad hoc wireless vehicular network.

The storage medium of this implementation includes, but not limited to, an independent memory, a memory arranged inside a computer, etc.

Embodiment IIII

This implementation is a device. The device includes a processor and a memory, where the memory stores at least one instruction, and the at least one instruction is loaded and executed by the processor, to implement the data-aware routing method for an ad hoc wireless vehicular network.

The device of this implementation includes, but not limited to, a personal computer (PC), a server, a mobile device, a specially developed single chip microcomputer, etc.

The present disclosure may have various other embodiments, without departing from the spirit and essence of the present disclosure, those skilled in the art would have been able to make various corresponding changes and modifications in accordance with the present disclosure, and these corresponding changes and modifications all fall within the scope of protection of the appended claims of the present disclosure.

What is claimed is:

1. A data-aware routing method for an ad hoc wireless vehicular network, comprising: for the wireless vehicular network, carrying out data routing in the wireless vehicular network on a basis of a joint scheduling based wireless vehicular network routing algorithm;

the joint scheduling based wireless vehicular network routing algorithm comprising:

the wireless vehicular network needing to transmit a given data packet set, the given data packet set being recorded as Φ, a source node of each data packet p being recorded as δ(p), and a destination node of each data packet p being recorded as ψ(p); p having no subscript being used for representing the data packet, and $p_i(\bullet)$ having a node subscript being used for representing a geographic position;

for a certain data packet p, a copy set of all the data packets in the wireless vehicular network being recorded as θ(p), and θ(p) being called as a data packet group;

when the data packets are subjected to one-time wireless transmission, a size of the data packet group being increased by 1;

overall transmission performance of the wireless vehicular network being a function of transmission performance of a single data packet, and a transmission success rate $\rho_p$ of the single data packet being as follows:

$$\rho_p = f_\gamma(\delta(p), \psi(p), \{T_n\}) \quad (4),$$

{Tn} representing a motion track set of all the nodes, and $f_\gamma(\bullet)$ representing a transmission success rate function;

a transmission latency $\sigma_p$ of the data packet p being as follows:

$$\sigma_p(\tau) = \tau + \Gamma_\gamma(\delta(p), \psi(p), \{T_n\}) \quad (5)$$

$\Gamma_\gamma(\bullet)$ representing a transmission latency function;

transmission cost $\varsigma_p$ of the data packet p being as follows:

$$\varsigma_p = |\vartheta(p)| \quad (6)$$

|θ(p)| representing capacity of the data packet group θ(p);

an optimal transmission strategy being as follows: maximizing the transmission success rate, minimizing the transmission latency and minimizing network cost:

$$\max \Sigma_{p\in\Phi} \mathbb{E}[\rho_p] \quad (7)$$

$$\min \Sigma_{p\in\Phi} \mathbb{E}[\sigma_p] \quad (8)$$

$$\min \Sigma_{p\in\Phi} \mathbb{E}[\hat{\varsigma}_p] \quad (9)$$

$\mathbb{E}[\cdot]$ representing an expectation; and
network transmission efficiency being as follows:

$$\ell \Sigma_{p\in\Phi} \mathbb{E}[\rho_p]/\Sigma_{p\in\Phi}\mathbb{E}[\hat{\varsigma}_p] \quad (10)$$

using a multi-order Markov chain to model position change processes of vehicle nodes, and predicting and estimating a next moment and several moments in the future under a condition that positions at previous several moments are given; and on a basis of position actual values and predicted estimated values of the vehicle nodes, combining the optimal transmission strategy to achieve data routing in the wireless vehicular network.

2. The data-aware routing method for the ad hoc wireless vehicular network according to claim 1, wherein a wireless vehicular network model and a crowd sensing model corresponding to the wireless vehicular network are as follows:

the wireless vehicular network model is constructed on a basis of an undirected graph; a geographic position of a vehicle node n at a moment $\tau$ is represented as $p_n(\tau)$, and a motion track of the node from a moment zero to the moment $\tau$ is discretized:

$$T_n = \langle p_n(0), p_n(1), \ldots p_n(\tau) \rangle$$

$\tau$ representing time after discretization;

a distance between two nodes i and j at the moment $\tau$ is represented as $d_{i,j}(\tau)$; all links capable of data transmission in the current wireless vehicular network are represented as $$L(\tau) = \{l_{i,j} | d_{i,j}(\tau) \leq R; \forall i,j \in N\}$$

$l_{i,j}$ representing a link between the nodes i and j, and R representing a link distance threshold; and the crowd sensing model is constructed: a sensing data function obtained by a vehicle i is as follows: $\Delta(t, p_i(t), i)$, pi(t) representing a corresponding geographic position of the vehicle i at a moment t.

3. The data-aware routing method for the ad hoc wireless vehicular network according to claim 2, wherein the wireless vehicular network model and the crowd sensing model corresponding to the wireless vehicular network are as follows:

the undirected graph of the wireless vehicular network model is G=(N, E), N being a set of vertices, each vertex representing a vehicle node, E being a set of edges, $\forall e \in E$, $e_n = ((i,j)$, c(t) and d(t)) being an edge between vertices i and j, and representing communication between the two nodes, c(t) representing contact of the nodes i and j at a moment c(t), and d(t) representing a contact duration.

4. The data-aware routing method for the ad hoc wireless vehicular network according to claim 3, wherein the link distance threshold R is 400 meters.

5. The data-aware routing method for the ad hoc wireless vehicular network according to claim 4, wherein a process of using the multi-order Markov chain to model the position change processes of the vehicle nodes comprises:

dividing an entire position space corresponding to the vehicle nodes into Q grids, the entire position space being represented as S:

$$S = \{s_0, s_1, \ldots, s_{Q-1} | s_i \cap s_{j'} = \emptyset\} \quad (12),$$

$s_0, s_1, \ldots, s_{Q-1}$ representing position spaces corresponding to the grids in the entire position space, and $s_{i''}$ and $s_{j''}$ representing position spaces corresponding to the grids in the entire position space respectively;

at a certain moment, taking a certain value in S as a position of the vehicle i, and the certain value being recorded as $S_i$; determining space-time correlation of vehicle motion by entropy and conditional entropy of a position random variable $S_i$;

for the vehicle i, assuming that the position of the vehicle i at L times is observed, a position sequence of the vehicle being represented as: $T_i = \langle s_0, s_1, \ldots, s_{L-1} \rangle$; and assuming that the vehicle i appears for $o_{j''}$ times at the position $s_{j''}$ in the sequence, marginal entropy of Si being as follows:

$$H(S_i) = \sum_{j''=0}^{Q-1} (o_{j''}/L) \times \log_2 \frac{1}{o_{j''}/L} \quad (13)$$

the conditional entropy of $S_i$ under a condition that a position variable $S_i^1$, at a previous moment is given being as follows:

$$H(S_i|S_i^1) = H(S_i, S_i^1) - H(S_i) \quad (14), \text{ and}$$

entropy of a joint position random variable being as follows:

$$H(S_i, S_i^1) = \sum_{j''=1}^{Q-1} \frac{o_{j''-1,j''}}{L-1} \times \log_2 \frac{1}{o_{j''-1,j''}/(L-1)} \quad (15)$$

$o_{j''-1,j''}$ representing a number of occurrences of the vehicle in positions $s_{j''-1}$ and $s_{j''}$ in the sequence;

on a basis of a same method, obtaining conditional entropy of given position variables at previous K moments:

$$H(S_i|S_i^1, S_i^2, \ldots S_i^K) \quad (16); \text{ and}$$

predicting and estimating positions of the vehicle nodes on a basis of the multi-order Markov chain.

6. The data-aware routing method for the ad hoc wireless vehicular network according to claim 2, wherein a process of using the multi-order Markov chain to model the position change processes of the vehicle nodes comprises:

dividing an entire position space corresponding to the vehicle nodes into Q grids, the entire position space being represented as S:

$$S = \{s_0, s_1, \ldots, s_{Q-1} | s_i \cap s_{j'} = \emptyset\} \quad (12)$$

$s_0, s_1, \ldots, s_{Q-1}$ representing position spaces corresponding to the grids in the entire position space, and $s_{i''}$ and $s_{j''}$ representing position spaces corresponding to the grids in the entire position space respectively;

at a certain moment, taking a certain value in S as a position of the vehicle i, and the certain value being recorded as $S_i$; determining space-time correlation of vehicle motion by entropy and conditional entropy of a position random variable $S_i$;

for the vehicle i, assuming that the position of the vehicle i at L times is observed, a position sequence of the vehicle being represented as: $T_i = \langle s_0, s_1, \ldots, s_{L-1} \rangle$; and assuming that the vehicle i appears for $o_{j''}$ times at the position $s_{j''}$ in the sequence, marginal entropy of Si being as follows:

$$H(S_i) = \sum_{j''=0}^{Q-1} (o_{j''}/L) \times \log_2 \frac{1}{o_{j''}/L} \quad (13)$$

the conditional entropy of $S_i$ under a condition that a position variable $S_i^1$, at a previous moment is given being as follows:

$$H(S_i|S_i^1) = H(S_i, S_i^1) - H(S_i) \quad (14), \text{ and}$$

entropy of a joint position random variable being as follows:

$$H(S_i, S_i^1) = \sum_{j''=1}^{Q-1} \frac{o_{j''-1,j''}}{L-1} \times \log_2 \frac{1}{o_{j''-1,j''}/(L-1)} \quad (15)$$

$o_{j'\square 1,j''}$ representing a number of occurrences of the vehicle in positions $s_{j'\square 1}$ and $s_{j''}$ in the sequence;

on a basis of a same method, obtaining conditional entropy of given position variables at previous K moments:

$$H(S_i|S_i^1, S_i^2, \ldots S_i^K) \quad (16); \text{ and}$$

predicting and estimating positions of the vehicle nodes on a basis of the multi-order Markov chain.

7. The data-aware routing method for the ad hoc wireless vehicular network according to claim 3, wherein a process of using the multi-order Markov chain to model the position change processes of the vehicle nodes comprises:

dividing an entire position space corresponding to the vehicle nodes into Q grids, the entire position space being represented as S:

$$S = \{s_0, s_1, \ldots, s_{Q-1} | s_i \cap s_j = \emptyset\} \quad (12)$$

$s_0, s_1, \ldots, s_{Q-1}$ representing position spaces corresponding to the grids in the entire position space, and $s_{i''}$ and $s_{j''}$ representing position spaces corresponding to the grids in the entire position space respectively;

at a certain moment, taking a certain value in S as a position of the vehicle i, and the certain value being recorded as $S_i$; determining space-time correlation of vehicle motion by entropy and conditional entropy of a position random variable $S_i$:

for the vehicle i, assuming that the position of the vehicle i at L times is observed, a position sequence of the vehicle being represented as: $T_i = \langle s_0, s_1, \ldots, s_{L\square 1} \rangle$; and assuming that the vehicle i appears for $o_{j''}$ times at the position $s_{j''}$ in the sequence, marginal entropy of Si being as follows:

$$H(S_i) = \sum_{j''=0}^{Q-1} (o_{j''}/L) \times \log_2 \frac{1}{o_{j''}/L} \quad (13)$$

the conditional entropy of $S_i$ under a condition that a position variable $S_i^1$, at a previous moment is given being as follows:

$$H(S_i|S_i^1) = H(S_i, S_i^1) - H(S_i) \quad (14), \text{ and}$$

entropy of a joint position random variable being as follows:

$$H(S_i, S_i^1) = \sum_{j''=1}^{Q-1} \frac{o_{j''-1,j''}}{L-1} \times \log_2 \frac{1}{o_{j''-1,j''}/(L-1)} \quad (15)$$

$o_{j'\square 1,j''}$ representing a number of occurrences of the vehicle in positions $s_{j'\square 1}$ and $s_{j''}$ in the sequence;

on a basis of a same method, obtaining conditional entropy of given position variables at previous K moments:

$$H(S_i|S_i^1, S_i^2, \ldots S_i^K) \quad (16); \text{ and}$$

predicting and estimating positions of the vehicle nodes on a basis of the multi-order Markov chain.

8. The data-aware routing method for the ad hoc wireless vehicular network according to claim 1, wherein a process of using the multi-order Markov chain to model the position change processes of the vehicle nodes comprises:

dividing an entire position space corresponding to the vehicle nodes into Q grids, the entire position space being represented as S:

$$S = \{s_0, s_1, \ldots, s_{Q-1} | s_i \cap s_j = \emptyset\} \quad (12)$$

$s_0, s_1, \ldots, s_{Q-1}$ representing position spaces corresponding to the grids in the entire position space, and $s_{i''}$ and $s_{j''}$ representing position spaces corresponding to the grids in the entire position space respectively;

at a certain moment, taking a certain value in S as a position of the vehicle i, and the certain value being recorded as $S_i$; determining space-time correlation of vehicle motion by entropy and conditional entropy of a position random variable $S_i$:

for the vehicle i, assuming that the position of the vehicle i at L times is observed, a position sequence of the vehicle being represented as: $T_i = \langle s_0, s_1, \ldots, s_{L\square 1} \rangle$; and assuming that the vehicle i appears for $o_{j''}$ times at the position $s_{j''}$ in the sequence, marginal entropy of Si being as follows:

$$H(S_i) = \sum_{j''=0}^{Q-1} (o_{j''}/L) \times \log_2 \frac{1}{o_{j''}/L} \quad (13)$$

the conditional entropy of $S_i$ under a condition that a position variable $S_i^1$, at a previous moment is given being as follows:

$$H(S_i|S_i^1) = H(S_i, S_i^1) - H(S_i) \quad (14), \text{ and}$$

entropy of a joint position random variable being as follows:

$$H(S_i, S_i^1) = \sum_{j''=1}^{Q-1} \frac{o_{j''-1,j''}}{L-1} \times \log_2 \frac{1}{o_{j''-1,j''}/(L-1)} \quad (15)$$

$o_{j'\square 1,j''}$ representing a number of occurrences of the vehicle in positions $s_{j'\square 1}$ and $s_{j''}$ in the sequence;

on a basis of a same method, obtaining conditional entropy of given position variables at previous K moments:

$$H(S_i|S_i^1, S_i^2, \ldots S_i^K) \quad (16); \text{ and}$$

predicting and estimating positions of the vehicle nodes on a basis of the multi-order Markov chain.

9. The data-aware routing method for the ad hoc wireless vehicular network according to claim 5, wherein the entire position space corresponding to the vehicle nodes is divided into the Q grids having a grid size of 200 m*200 m.

10. A data-aware routing system for the ad hoc wireless vehicular network, used for executing the data-aware routing method for the ad hoc wireless vehicular network of claim 1.

11. The data-aware routing system for the ad hoc wireless vehicular network according to claim 10, wherein a wireless vehicular network model and a crowd sensing model corresponding to the wireless vehicular network are as follows:

the wireless vehicular network model is constructed on a basis of an undirected graph; a geographic position of a vehicle node n at a moment τ is represented as $p_n(τ)$, and a motion track of the node from a moment zero to the moment τ is discretized:

$$T_n = \langle p_n(0), p_n(1), \ldots p_n(τ) \rangle$$

τ representing time after discretization;
a distance between two nodes i and j at the moment τ is represented as $d_{ij}(τ)$, all links capable of data transmission in the current wireless vehicular network are represented as $$L(τ) = \{l_{i,j} | d_{i,j}(τ) \leq R; \forall i,j \in N\}$$

$l_{i,j}$ representing a link between the nodes i and j, and R representing a link distance threshold; and
the crowd sensing model is constructed: a sensing data function obtained by a vehicle i is as follows: $Δ(t, p_i(t), i)$,
pi(t) representing a corresponding geographic position of the vehicle i at a moment t.

12. The data-aware routing system for the ad hoc wireless vehicular network according to claim 11, wherein the wireless vehicular network model and the crowd sensing model corresponding to the wireless vehicular network are as follows:

the undirected graph of the wireless vehicular network model is G=(N, E), N being a set of vertices, each vertex representing a vehicle node, E being a set of edges, $\forall e \in E$, $e_n=((i,j), c(t)$ and $d(t))$ being an edge between vertices i and j, and representing communication between the two nodes, c(t) representing contact of the nodes i and j at a moment c(t), and d(t) representing a contact duration.

13. The data-aware routing method for the ad hoc wireless vehicular network according to claim 12, wherein the link distance threshold R is 400 meters.

14. The data-aware routing method for the ad hoc wireless vehicular network according to claim 10, wherein a process of using the multi-order Markov chain to model the position change processes of the vehicle nodes comprises:

dividing an entire position space corresponding to the vehicle nodes into Q grids, the entire position space being represented as S:

$$S = \{s_0, s_1, \ldots, s_{Q-1} | s_{i''} \cap s_{j''} = \emptyset\} \quad (12)$$

$s_0, s_1, \ldots, s_{Q-1}$ representing position spaces corresponding to the grids in the entire position space, and $s_{i''}$ and $s_{j''}$ representing position spaces corresponding to the grids in the entire position space respectively;
at a certain moment, taking a certain value in S as a position of the vehicle i, and the certain value being recorded as $S_i$; determining space-time correlation of vehicle motion by entropy and conditional entropy of a position random variable $S_i$:
for the vehicle i, assuming that the position of the vehicle i at L times is observed, a position sequence of the vehicle being represented as: $T_i = \langle s_0, s_1, \ldots, s_{L-1} \rangle$; and assuming that the vehicle i appears for $o_{j''}$ times at the position $s_{j''}$ in the sequence, marginal entropy of Si being as follows:

$$H(S_i) = \sum_{j''=0}^{Q-1} (o_{j''}/L) \times \log_2 \frac{1}{o_{j''}/L} \quad (13)$$

the conditional entropy of $S_i$ under a condition that a position variable $S_i^1$, at a previous moment is given being as follows:

$$H(S_i|S_i^1) = H(S_i, S_i^1) - H(S_i) \quad (14), \text{ and}$$

entropy of a joint position random variable being as follows:

$$H(S_i, S_i^1) = \sum_{j''=1}^{Q-1} \frac{o_{j''-1,j''}}{L-1} \times \log_2 \frac{1}{o_{j''-1,j''}/(L-1)} \quad (15)$$

$o_{j''-1,j''}$ representing a number of occurrences of the vehicle in positions $s_{j''-1}$ and $s_{j''}$ in the sequence;
on a basis of a same method, obtaining conditional entropy of given position variables at previous K moments:

$$H(S_i|S_i^1, S_i^2, \ldots S_i^K) \quad (16); \text{ and}$$

predicting and estimating positions of the vehicle nodes on a basis of the multi-order Markov chain.

15. The data-aware routing method for the ad hoc wireless vehicular network according to claim 14, wherein the entire position space corresponding to the vehicle nodes is divided into the Q grids having a grid size of 200 m*200 m.

16. A storage medium, storing at least one instruction, wherein the at least one instruction is loaded and executed by a processor, to implement the data-aware routing method for the ad hoc wireless vehicular network of claim 1.

17. The storage medium according to claim 16, wherein a wireless vehicular network model and a crowd sensing model corresponding to the wireless vehicular network are as follows:

the wireless vehicular network model is constructed on a basis of an undirected graph; a geographic position of a vehicle node n at a moment τ is represented as $p_n(τ)$, and a motion track of the node from a moment zero to the moment τ is discretized:

$$T_n = \langle p_n(0), p_n(1), \ldots p_n(τ) \rangle$$

τ representing time after discretization;
a distance between two nodes i and j at the moment τ is represented as $d_{ij}(τ)$; all links capable of data transmission in the current wireless vehicular network are represented as $$L(τ) = \{l_{i,j} | d_{i,j}(τ) \leq R; \forall i,j \in N\}$$

$l_{i,j}$ representing a link between the nodes i and j, and R representing a link distance threshold; and
the crowd sensing model is constructed: a sensing data function obtained by a vehicle i is as follows: $Δ(t, p_i(t), i)$,
pi(t) representing a corresponding geographic position of the vehicle i at a moment t.

18. The storage medium according to claim 17, wherein the wireless vehicular network model and the crowd sensing model corresponding to the wireless vehicular network are as follows:

the undirected graph of the wireless vehicular network model is G=(N, E), N being a set of vertices, each vertex representing a vehicle node, E being a set of edges, $\forall e \in E$, $e_n=((i,j), c(t)$ and $d(t))$ being an edge between vertices i and j, and representing communication between the two nodes, c(t) representing contact of the nodes i and j at a moment c(t), and d(t) representing a contact duration.

19. The storage medium according to claim 18, wherein the link distance threshold R is 400 meters.

20. A device, comprising a processor and a memory, wherein the memory stores at least one instruction, and the at least one instruction is loaded and executed by the processor, to implement the data-aware routing method for the ad hoc wireless vehicular network of claim 1.

* * * * *